United States Patent
Nilsson et al.

(10) Patent No.: US 6,332,073 B1
(45) Date of Patent: *Dec. 18, 2001

(54) EMERGENCY NUMBER DIALING FROM A FIXED CELLULAR TERMINAL

(75) Inventors: Ulf Tomas Weine Nilsson, Stockholm (SE); Hussein Abbas Alayan, Morrisville; Jeffrey A. Armantrout, Cary, both of NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,994

(22) Filed: Oct. 19, 1998

(51) Int. Cl.$^7$ .................................................. H04M 11/00
(52) U.S. Cl. ............................................ 455/404; 455/521
(58) Field of Search .................................... 455/404, 422, 455/521, 414; 379/355, 356, 37, 38, 39, 40, 41, 42, 43, 44, 45, 46, 47, 48, 49, 50, 51

(56) References Cited

U.S. PATENT DOCUMENTS

| | | |
|---|---|---|
| 4,658,096 | 4/1987 | West, Jr. et al. . |
| 4,737,975 | 4/1988 | Shafer . |
| 4,775,997 | 10/1988 | West, Jr. et al. . |
| 4,839,892 | 6/1989 | Sasaki . |
| 4,922,517 | 5/1990 | West, Jr. et al. . |
| 5,563,931 | 10/1996 | Drucker et al. . |
| 5,680,493 * | 10/1997 | Aguilera et al. ................. 455/404 |
| 5,884,148 * | 3/1999 | Bilgic et al. ..................... 455/404 |
| 6,073,005 * | 6/2000 | Raith et al. ...................... 455/404 |
| 6,115,598 * | 9/2000 | Yu ................................... 455/404 |

FOREIGN PATENT DOCUMENTS

WO 87/07800 A   12/1987   (WO) .

* cited by examiner

Primary Examiner—Marsha D. Banks-Harold
(74) Attorney, Agent, or Firm—Coats & Bennett, P.L.L.C.

(57) ABSTRACT

A fixed cellular terminal screens outgoing calls for an emergency number by comparing each digit as it is dialed to the corresponding digit in one or more previously stored emergency numbers. If all of the digits match the emergency number, an emergency call is placed. Normal call processing begins when one of the dialed digits does not match its respective digit in the emergency number.

14 Claims, 2 Drawing Sheets

EMERGENCY NUMBER DIALING FROM A FIXED CELLULAR TERMINAL

FIELD OF THE INVENTION

This invention relates to fixed cellular telephony, and, more specifically, to the area of making an emergency call from a fixed cellular terminal.

BACKGROUND OF THE INVENTION

Since the introduction of emergency number dialing in the 1960's, almost every telephone service provider in almost every country has some form of emergency number. A person can dial the emergency number from virtually any telephone (even a pay phone) and be connected to emergency services. Emergency numbers are selected so that they can be easily recalled and dialed. In the U.S., for example, the number is "911." In Sweden, the number is "112."

Emergency number dialing is also practiced in wireless networks. Most wireless stations recognize one or more emergency numbers (911, 999, *999, etc.) and access the wireless network differently than in a regular call. A special emergency message is sent to the wireless system, which causes the wireless system to bypass most or all of the call setup (digit analysis and so forth) and authentication steps commonly performed. A call is immediately set up directly to the public safety answering point. Even a wireless station that is not yet activated can place an emergency call.

Emergency number dialing, however, is not quite as simple or straight forward in a new and rapidly growing sector of the local telephone market. Fixed cellular is becoming the solution of choice for providing telecommunication services for a number of diverse applications. In fixed cellular, one or more standard telephones (sometimes called plain old telephones or "POTS"), facsimile machines, modems, etc. in a home or office are connected via normal premises wiring to a line interface controller and then to a cellular terminal. The cellular terminal provides service for the fixed cellular telephones through the air interface of a cellular communications system, just like any other cellular communication device.

Telecommunications providers attempting to enter the local service market use fixed cellular to serve a number of customer premises with a minimal investment in infrastructure. The cost of running wire through the entire area to serve a few customers is avoided. More importantly, erecting a few cellular towers and installing a little customer premise equipment may rapidly develop areas that did not formerly have telephone service at all.

As stated above, the telephones in fixed cellular systems are essentially identical to those used in wireline service. In fixed cellular systems, however, the steps for placing a call are slightly different. Generally, there are three approaches in common usage for placing a call in the fixed cellular environment: send key dialing, timeout dialing and digit-by-digit dialing.

Send key dialing is similar to the standard operation of a mobile telephone. At the conclusion of entering the destination telephone number, the user presses a predefined key on the telephone to instruct the fixed wireless system to send the call to the wireless network. The send key is usually the "#" or "★" key on a standard telephone keypad. Once the call is finally sent to the wireless network, it receives the same priority and processing as any other emergency access. However, if the user forgets to dial the send key (not a common operation to people conditioned to normal landline dialing, especially in an emergency), the emergency call will never be sent.

In timeout dialing, the fixed cellular service attempts to analyze the dialed digits to determine the last number dialed by the subscriber so that the user does not have to press a send key. If a timer expires without any keys being pressed (typically 3–5 seconds from the last number dialed) the digits are sent to the wireless network to set up a call. In emergencies, the user must wait for the Umeout, usually without any audible feedback from the telephone. In an emergency, a user may become confused after dialing the emergency number and perhaps think that the call did not go through. If the user hangs up and tries again, the delay of call completion increases.

Digit-by-digit dialing automatically places a cellular call to a predefined telephone number at the mobile switching system (sometimes called a "roamer port") as soon as the user starts dialing. The dialed digits are collected and transmitted to the mobile switching system for analysis and call connection. The cellular system does not recognize the access as an emergency, since the first part of the cellular access is to the roamer port. Further, the mobile station to cellular network interaction is no different from any other call. If the serial number checking or authentication fail during the access, then the call is not completed at all.

SUMMARY OF THE INVENTION

According to one aspect of this invention, a method is disclosed for use in a fixed cellular terminal for screening outgoing calls for an emergency number. The emergency number comprises a predefined string of digits. The method comprises the steps of (a) receiving a first dialed digit, (b) comparing the first dialed digit to the first digit of the emergency number, and (c) if the first dialed digit matches the first digit of the emergency number, receiving a next dialed digit. The method further includes the steps of (d) comparing the next dialed digit to the next digit of the emergency number, (e) repeating step (d) until either the next dialed digit does not match the next digit of the emergency number or the dialed digits match all of the plurality of digits of the emergency number and (f) if all of the dialed digits matched all of the plurality of digits of the emergency number, an emergency cellular call is set up.

In accordance with a preferred form of this aspect of the invention, the step of setting up an emergency cellular call includes bypassing normal cellular call set up procedures. In another preferred form of this invention, there is a plurality of emergency numbers and, in a further preferred form, step (b) comprises comparing the first dialed digit to the first digit of each of the plurality of emergency numbers, and step (d) comprises comparing the next dialed digit to the next digit of each of the plurality of emergency numbers. According to a further form of this aspect of the invention, step (e) comprises repeating steps (d) and (e) until the dialed digits match all of the digits of one of the plurality of emergency numbers, or one of the dialed digits does not match its corresponding digit in one of the plurality of emergency numbers.

In another aspect of this invention, a cellular unit is provided which is operable in a cellular network that connects a call to a public safety answering point having an emergency number responsive to an emergency message. The cellular unit has an input device for dialing digits and further includes a digit collector adapted to receive each dialed digit, a memory storing an emergency number, a controller adapted to sequentially compare each received dialed digit to the emergency number; and a cellular terminal adapted to send an emergency message to the cellular network responsive to the controller matching all of the received dialed digits to all of the digits of the emergency number.

It is an object of the present invention to provide a fixed cellular terminal that may be reliably used by all people, particularly in emergencies.

It is another object of the present invention to provide a fixed cellular terminal that may be reliably used in emergencies by persons who are unaware that the terminal is cellular.

It is still another object of the present invention to provide a fixed cellular terminal that quickly and reliably connects an emergency call.

BRIEF DESCRIPTION OF THE DRAWINGS

A more complete understanding of this invention may be obtained from a consideration of the following detailed description in conjunction with the drawings, in which.

DETAILED DESCRIPTION

Figure 1:
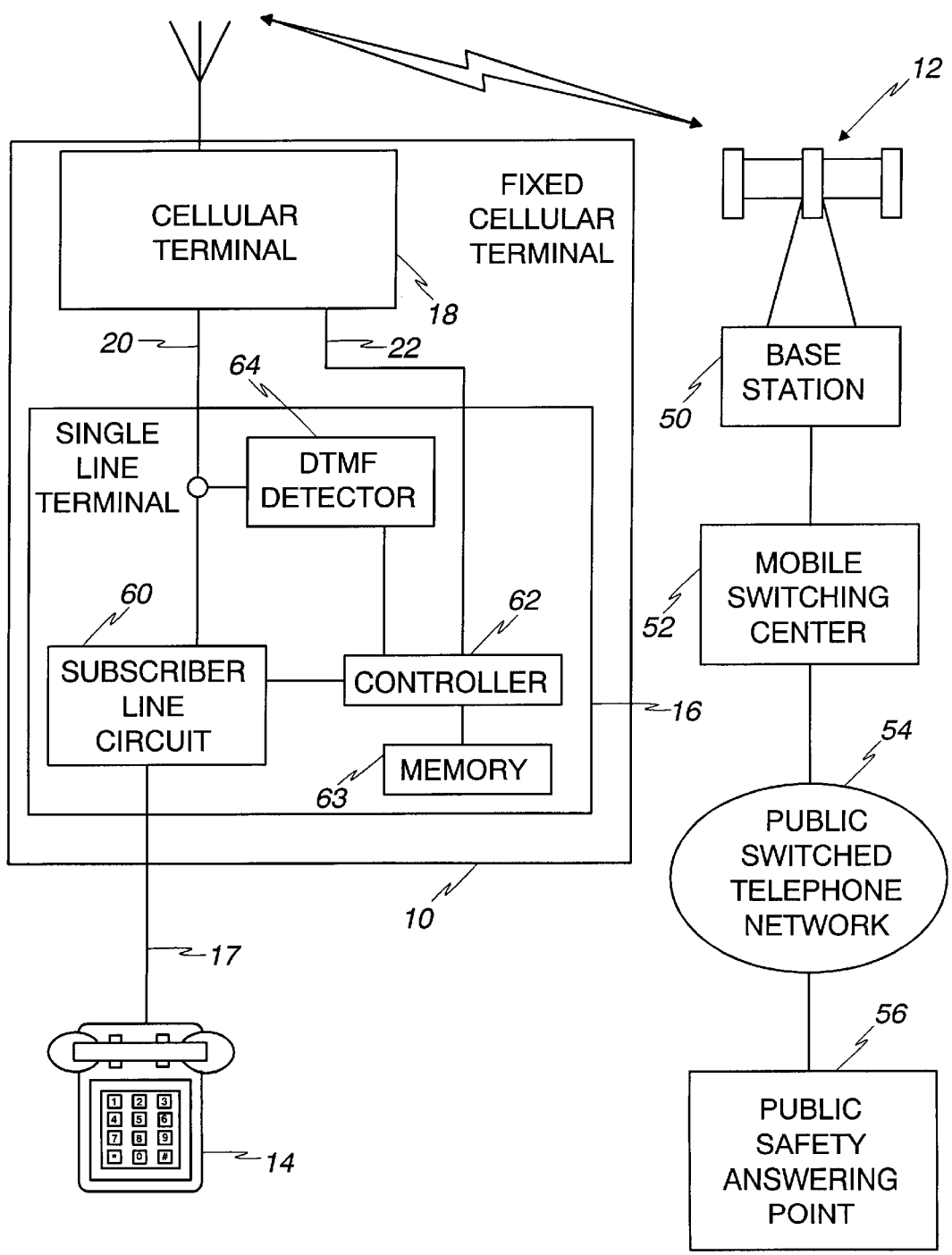
FIG. 1 is a block diagram of a fixed cellular system in a cellular network wherein an embodiment of this invention may operate.

FIG. 1 is a block diagram of a fixed cellular terminal 10 operating in a cellular network, shown generally at 12, that can make emergency calls without performing all of the normal call processing steps. A plain old telephone service (POTS) type telephone 14 is connected to the fixed cellular terminal 10 at a line interface unit (LIU) 16 by way of a standard telephone line 17. Of course, a LIU 16 can support more telephones, as well as facsimile machines, computer modems and other telephone line based devices.

The fixed cellular terminal 10 includes the LIU 16 and a cellular terminal 18. The cellular terminal 18 provides wireless telephone service in the same manner as any wireless telephone that is known in the art. The cellular terminal 18 is part of the LIU 16 and is connected to the subscriber line interface by an analog line 20 (a standard voice or data path) and multiple control and data lines line 22. The LIU 16 provides the standard analog telephone interface to the user and translates DTMF and other signaling (such as on hook, off hook, etc.) from the telephone 14 into data usable by the cellular terminal 18 to setup, tear down, etc. telephone calls.

The cellular network 12 includes one or more base stations 50 that effect communication with cellular units and manage the air connection. The base station 50 is connected to a mobile switching center 52 that manages all calls within its service region, connects cellular terminals to each other, and connects calls between cellular terminals and the public switched telephone network 54. The public switched telephone network 54 provides local and long distance switching. The public switched telephone network 54 is also connected to one or more public safety answering points 56, each usually serving a geographic region, as is known in the art.

To make an emergency call, the caller removes the receiver of telephone 14 (goes "off hook"). A subscriber line circuit 60 connected to the telephone line 17 senses the change in state, and reports the off hook condition to a controller 62. The controller 62 controls the operation of LIU 16 using programs and data stored in a memory 63. Subscriber line circuit 60 provides dial tone to telephone 14. In the prior art fixed wireless call set up procedure, the cellular terminal 18 is notified and begins the cellular call set up routine. In digit-by-digit fixed wireless, a call is placed to the roamer port at the mobile switching center, as is known in the art. According to this invention, however, no action is taken at the cellular terminal at this point.

A dual tone, multifrequency detector (DTMF) 64 detects DTMF signals ("touch tones") as the user enters them at telephone 14. Each tone pair is decoded and the corresponding digit is reported to controller 62.

According to our invention, the controller 62 compares each digit as it is received from DTMF detector 64 to the digits in an emergency number ("911", for example) stored in the memory 63. If the first digit matches the first digit of the emergency number, the second digit is compared to the second digit of the emergency number. If the second digits match, then the third digit is compared to the third digit of the emergency number, and so forth, until the entered digits have been matched to the stored emergency number. If any digit does not match, then normal call processing takes place. For example, in an area that uses 911 as an emergency number, an office code of 916 would match the first and second digits, but fail in the third. Normal call processing takes over after the third digit is entered.

In accordance with other alternative embodiments, comparison could be performed at the cellular terminal or at any other point in the phone system between the dial input (telephone 14) and the output generating the signal of the fixed cellular terminal 10 to the cellular network 12.

In areas where more than one emergency number is used, the controller 62 compares the dialed digits to each stored emergency number, dropping out comparisons to emergency numbers as the digits do not match. If one emergency number is left, the emergency system is used. If all of the emergency numbers are dropped, normal call processing takes over.

Once an emergency number is matched, the controller 62 notifies the cellular terminal 18 that an emergency call is required. The cellular terminal 18 immediately sends the emergency message over the air to the base station 50 in the cellular network, instead of normal call set up. The base station 50 reports the emergency message to its mobile switching center 52, which causes a call to be set up between base station 50 and cellular terminal 18. Simultaneously, mobile switching center 52 connects the call through the public switched telephone network 54 to the appropriate public safety answering point 56. This emergency message, as is known in the art, bypasses all of the call setup message traffic that adds time to call setup. The emergency message also bypasses verification, so that the cellular terminal 18 can complete an emergency call if, for example, the cellular terminal 18 is not activated.

Figure 2:
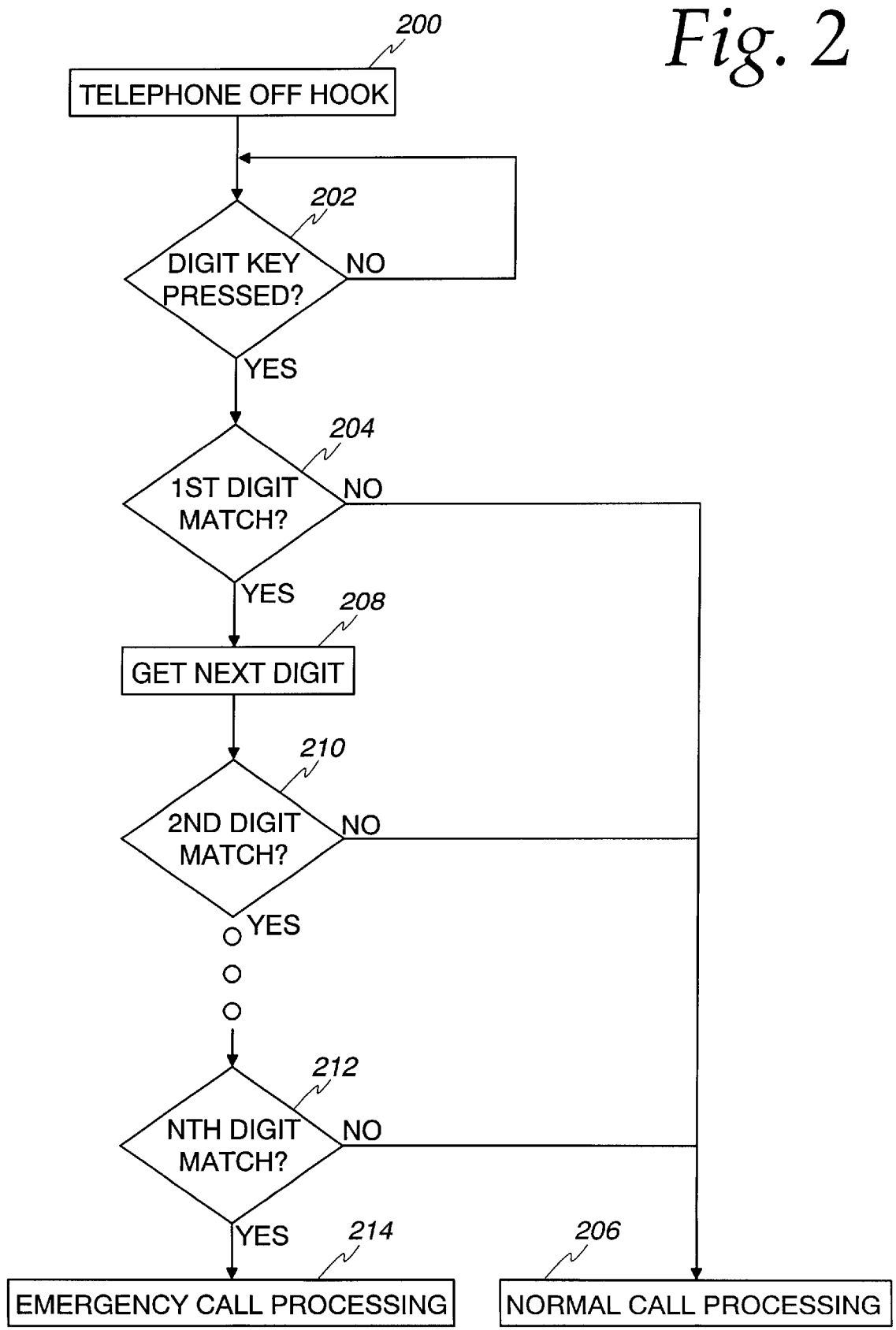
FIG. 2 is a flowchart of operation of an exemplary embodiment of this invention.

FIG. 2 is a flowchart of an exemplary operation of our invention. Processing starts in box 200, where the telephone off hook is detected. As opposed to the prior art, nothing is done in the cellular terminal at this time (no call set up message or call to the roamer port, etc.). Processing continues to decision diamond 202 where a determination is made whether a digit key has been pressed. When a digit key is pressed, the digit is compared at decision diamond 204 to the first digit of the emergency number. Alternatively, the first digit entered may be compared to the first digit of several different emergency numbers. If the first digit entered does not match the first digit of any of the emergency numbers, then processing moves to box 206, where normal call processing procedure is followed.

If, in decision diamond 204, the first digit entered matched the first digit of any of the emergency numbers, then processing proceeds to action box 208, where the second digit is received. In decision diamond 210, the second digit is compared to the second digit of one or more stored emergency numbers. If it does not match, then processing moves to box 206 where normal call processing procedure is followed.

If, in decision diamond 210, the second digit matches the second digit of one or more of the stored emergency numbers, then processing continues to obtain digits and sequentially match them to the digit in the same ordinal position in the one or more emergency numbers. If number matching continues to the last (Nth) number, in decision diamond 212 a determination is made whether the Nth received digit matches the Nth digit in any emergency number that has matched N−1 numbers. If it does, then an emergency number has been entered, and processing moves to action box 214 where the cellular networks emergency procedure is followed.

It will therefore be apparent that the invention provides a method that can be used in any fixed cellular terminal that can distinguish emergency numbers and take advantage of the cellular network's emergency procedure regardless of the usual dialing procedure of the fixed cellular terminal. Consequently, any person may use the fixed cellular terminal to reliably place an emergency call as if the terminal were a wireline terminal. It will further be appreciated that the invention may be added to existing fixed cellular terminals with minimal reprogramming of the LIU.

It is to be understood that the above-described embodiment is to illustrate the principles of this invention, and that those skilled in the art may devise many variations without departing from the scope of the invention. It is, therefore, intended that such variations be included within the scope of the appended claims.

We claim:

1. A method for use in a fixed cellular unit requiring an action by the cellular unit or a user of the cellular unit after dialing a number to initiate an outgoing call to said number, said method screening outgoing calls for an emergency number comprising a plurality of digits, said method comprising:

(a) receiving a first dialed digit;
   (b) comparing the first dialed digit to the first digit of the emergency number;
   (c) if the first dialed digit matches the first digit of the emergency number, receiving a next dialed digit;
   (d) comparing the next dialed digit to the next digit of the emergency number;
   (e) repeating step (d) until either the next dialed digit does not match the next digit of the emergency number or the dialed digits match all of the digits of the emergency number;
   (f) inhibiting said cellular unit from initiating the acquisition of a communication channel an outgoing call while performing steps (a) through (e), and
   (g) responsive to receipt of dialed digits matching all of the digits of the emergency number, bypassing said action required to initiate an outgoing call and immediately setting up an emergency cellular call.

2. The method of claim 1 wherein the step of setting up an emergency cellular call further includes bypassing normal call set up procedures.

3. The method of claim 1 wherein the emergency number comprises a plurality of emergency numbers, wherein step (b) comprises:

comparing the first dialed digit to the first digit of each of the plurality of emergency numbers; and wherein step (d) comprises:
   comparing the next dialed digit to the next digit of each of the plurality of emergency numbers.

4. The method of claim 3 further comprising ceasing repetition of step (d) responsive to receipt of one dialed digit that does not match the next digit of the emergency number.

5. The method of claim 1 further comprising ceasing repetition of step (d) responsive to receipt of one dialed digits that does not match the next digit of the emergency number.

6. A cellular unit for use in a cellular network that connects a call to a public safety answering point having an emergency number responsive to an emergency message, the cellular unit having an input device for dialing digits and requiring an action by the cellular unit or the user after dialing to initiate an outgoing call to a dialed number, the cellular unit comprising:

a digit collector adapted to sequentially receive each digit dialed at the input device;
   a memory storing an emergency number having digits;
   a controller adapted to sequentially compare each received dialed digit in the digit collector to the emergency number digits, and to inhibit said cellular unit from initiating the acquisition of a communication channel an outgoing call while said controller is sequentially comparing each received dialed digit in the digit collector to the emergency number digits; and
   a cellular terminal adapted to bypass the required action and immediately send an emergency message to the cellular network responsive to the controller matching all of the received dialed digits to the digits of the emergency number.

7. The cellular unit of claim 6 wherein the cellular terminal is fixed in one location.

8. The cellular unit of claim 6 wherein the memory is adapted to store a plurality of emergency numbers, the controller being adapted to sequentially compare each dialed digit to the digits in each of the plurality of emergency numbers.

9. The cellular unit of claim 8 wherein the cellular terminal is adapted to send the emergency message responsive to the received dialed digits matching any one of the emergency numbers.

10. A method for use in a cellular unit operating in a cellular network that connects a call to a public safety answering point having an emergency number responsive to an emergency message, the cellular unit having a digit input device and requiring an action by the cellular unit or a user of the cellular unit after dialing to initiate an outgoing call to said number, the method comprising:

receiving each digit as it is input in the input device;
   sequentially comparing each digit as it is received to digits of the emergency number;
   inhibiting said cellular unit from initiating the acquisition of a communication channel an outgoing call while receiving and sequentially comparing said digits;
   using normal call processing if any of the compared digits do not match; and
   bypassing said action required to initiate an outgoing call and immediately sending an emergency message to the cellular network if the received digits match all of the corresponding digits of the emergency number.

11. The method of claim 10 wherein the step of sending an emergency message further includes bypassing the normal call processing step of sending a set up request message.

12. The method of claim 10 wherein the emergency number comprises a plurality of emergency numbers, wherein the step of comparing comprises:

sequentially comparing each digit as it is received to digits of each of the emergency numbers.

13. The method of claim 1, wherein said action is pressing a send key, and said bypassing said action comprises immediately setting up an emergency cellular call without pressing said send key.

14. The method of claim 1, wherein said action is waiting a selected period of time, and said bypassing said action comprises immediately setting up an emergency cellular call without waiting said selected period of time.

* * * * *